United States Patent
Takei et al.

(10) Patent No.: US 8,380,124 B2
(45) Date of Patent: Feb. 19, 2013

(54) COMMUNICATION SYSTEM BY ELECTROSTATIC COUPLING AND ELECTROMAGNETIC INDUCTION

(75) Inventors: Ken Takei, Kawasaki (JP); Futoshi Furuta, Kokubunji (JP); Hiroshi Kageyama, Hachioji (JP)

(73) Assignees: Hitachi, Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 1065 days.

(21) Appl. No.: 12/320,253

(22) Filed: Jan. 22, 2009

(65) Prior Publication Data

US 2009/0197529 A1    Aug. 6, 2009

(30) Foreign Application Priority Data

Feb. 6, 2008    (JP) ................. 2008-026308

(51) Int. Cl.
*H04B 5/00*    (2006.01)
(52) U.S. Cl. .............. 455/41.1; 455/41.2; 455/41.3; 455/73
(58) Field of Classification Search ............. 455/41.1, 455/41.2, 41.3, 552.1, 553.1, 73, 78; 340/10.1
See application file for complete search history.

(56) References Cited

U.S. PATENT DOCUMENTS

| | | | | |
|---|---|---|---|---|
| 7,139,529 B2 * | 11/2006 | Rekimoto et al. | ........... | 455/41.3 |
| 7,330,702 B2 * | 2/2008 | Chen et al. | ...................... | 455/73 |
| 7,808,384 B2 * | 10/2010 | Stobbe et al. | .............. | 340/572.1 |
| 7,853,208 B2 * | 12/2010 | Washiro | ....................... | 455/41.1 |
| 7,860,455 B2 * | 12/2010 | Fukumoto et al. | ........... | 455/41.1 |
| 2008/0119135 A1 * | 5/2008 | Washiro | ....................... | 455/41.1 |
| 2009/0021352 A1 * | 1/2009 | Kataya et al. | ................ | 340/10.1 |
| 2009/0267084 A1 * | 10/2009 | Bilger et al. | .................... | 257/80 |
| 2010/0021176 A1 * | 1/2010 | Holcombe et al. | ........... | 398/115 |

FOREIGN PATENT DOCUMENTS

| JP | 05-342426 | 6/1992 |
|---|---|---|
| JP | 11-134450 | 10/1997 |

* cited by examiner

*Primary Examiner* — Lewis West
(74) *Attorney, Agent, or Firm* — Stites & Harbison, PLLC; Juan Carlos A. Marquez, Esq; Nicholas B. Trenkle

(57) ABSTRACT

A communication system by electrostatic coupling and electromagnetic induction includes: a first transmission part (3a) and a first reception part (3b) which exchange data therebetween through non-contact communication using electrostatic coupling; a second transmission part (4a) and a second reception part (4b) which exchange data therebetween through non-contact communication using electromagnetic induction; and an image display device (8) which displays an image based on the data thus received. With this configuration, it is possible to make communication performed by the first transmission part (3a) and the first reception part (3b) communication with higher speed, larger volume, and higher reliability.

14 Claims, 8 Drawing Sheets

COMMUNICATION SYSTEM BY ELECTROSTATIC COUPLING AND ELECTROMAGNETIC INDUCTION

CROSS-REFERENCE TO RELATED APPLICATION

The present application claims priority from Japanese application JP2008-026308 filed on Feb. 6, 2008, the content of which is hereby incorporated by reference into this application.

BACKGROUND OF THE INVENTION

1. Field of the Invention

The present invention relates to a communication system by electrostatic coupling and electromagnetic induction, which is a wireless communication system used for short/medium distance which is in a range constantly visible in a normal environment, and which, when information to be transmitted by the system has properties different in quantity or quality, efficiently transmits such various pieces of information from a base station to a terminal station. In particular, the present invention relates to a technology which relaxes an alignment requirement between the base station and the terminal station which are components of such a system, and is effective when applied to a-technology of efficiently transmitting such various pieces of information from the base station to the terminal station.

2. Description of the Related Art

JP 05-342426 A discloses a technology for information cards such as IC cards and memory cards, in which data is written through electric-field coupling, and is read through impedance changes of a coil. Further, JP 11-134450 A discloses a technology for non-contact IC cards, in which power transmission and PSK signal transmission are performed through electromagnetic induction, and non-contact signal transmission is performed through electrostatic coupling.

SUMMARY OF THE INVENTION

In the field of wireless communications, the advance of the semiconductor technology has enabled not only provision of downsized circuits which have wireless functions, but also formation of semiconductor integrated circuits on a variety of substrates. For those substrates, in addition to such semiconductors as a silicon substrate and a gallium arsenide substrate, it is also possible to employ an inorganic matter like glass, and an organic matter like polymer. Owing to this, wireless functions may be implemented to a variety of semiconductor integrated circuits with ease by employing manufacturing processes for devices with no wireless functions. As a result, it is becoming possible to add wireless functions to such devices.

A typical example thereof is a display. In order to develop a new function through the addition of a wireless function, intensive development has been taking place. For such application, unlike conventional wireless communication, it is necessary to achieve, in a normal environment, both image recognition through the display and wireless information transmission. Accordingly, wireless information transmission over short/medium distance becomes major focus. On the other hand, an image contains a large amount of information incomparable to sound or low-speed data, which has been dominant in the wireless information transmission so far. Hence, the amount of data for motion picture transmission, which is a continuous communication of a series of a plurality of fixed-image data pieces, becomes considerably enormous.

An electromagnetic wave, which is predominantly used in wireless communication, has an electrostatic field, an induction field, and a radiation field. In short-/medium-distance communication, the electrostatic field and the induction field are superior in terms of information transmission capability to the radiation field, which is the mainstream of the conventional wireless communication. For this reason, in a wireless communication system which requires short-/medium-distance transmission and transmission of large-scale data, it is desirable to use the electrostatic field and the induction field. Short-distance communication has such a characteristic that a larger amount of information may be transmitted in the electrostatic field than in the induction field. When a new device having the wireless functions described above is applied to an actual system, it is required that various pieces of information different in quantity or quality be transmitted. Here, the various pieces of information different in quantity or quality means such information pieces having different information amounts, such as sound, a still picture, and a motion picture, having different security levels, such as disclosable and concealment required, and having differences in reliability, such as uncorrectable and correctable.

As to wireless communication systems, there are known conventional technologies in which one communication means or a plurality of communication means are provided. For example, JP 05-342426 A and JP 11-134450 A disclose data transmission systems for short/medium distance, in which the electrostatic field and the induction field are provided as wireless interfaces. However, there is no consideration given to such a configuration in which the system focuses on qualitative/quantitative differences of data to be treated, uses those interfaces efficiently in a selective manner, and optimizes the data transmission efficiency as a whole system. Accordingly, such various pieces of information having different properties cannot be transmitted efficiently at the same time, and the power consumption is not optimized as a whole system. As a result, it is difficult to reduce the power consumption of the device, to downsize of the device, and to expand the service area of the wireless communication system.

In the electrostatic field, energy concentrates within a region, whereas, in the induction field, energy is eccentrically located around a region. Due to this, there occurs a large difference between the electrostatic field and the induction field in alignment which is required for transmitting the energy efficiently between the base station and the terminal station that are devices having wireless communication functions, such as between a non-contact/remote display drive device and a display terminal. Accordingly, with electrostatic coupling which is a transmission method using the electrostatic field, it is possible to perform data transmission with higher speed, larger volume, and higher reliability, but higher positional precision is required for the alignment between the base station and the terminal station. On the other hand, with electromagnetic induction which is a transmission method using the induction field, it allows a high degree of freedom of the alignment.

Hence, by using the electrostatic field and the induction field in a selective manner as information transmission means, it is possible to build a wireless communication system requiring different alignment degrees of freedom between the base station and the terminal station. Particularly, a display provided with wireless functions can take different modes of a stationary (fixed) mode and a mobile (movable)

mode for its application, and therefore it is to be expected that the application of displays is remarkably widened. However, conventional technologies such as JP 05-342426 A and JP 11-134450 A make no consideration to such a viewpoint, and hence the application of wireless communication systems has been limited.

Therefore, a representative object of the present invention is to realize a communication system by electrostatic coupling and electromagnetic induction, which is capable of efficiently transmitting, in short-/medium-distance wireless communication, various pieces of information different in quality or quantity from a base station to a terminal station.

The above-mentioned and other objects and novel features of the present invention will become apparent from the description of the present invention and the accompanying drawings.

An aspect of the invention disclosed herein is a communication system by electrostatic coupling and electromagnetic induction, including: a first transmission part for transmitting first information through non-contact communication using electrostatic coupling; a first reception part for receiving the first information through the non-contact communication using the electrostatic coupling; a second transmission part for transmitting second information through non-contact communication using electromagnetic induction; and a second reception part for receiving the second information through the non-contact communication using the electromagnetic induction.

The representative advantage of the present invention is described as follows.

According to a representative embodiment of the present invention, there is realized a communication system by electrostatic coupling and electromagnetic induction which is capable of efficiently transmitting, in short-/medium-distance wireless communication, various pieces of information different in quality or quantity from a base station to a terminal station.

DETAILED DESCRIPTION OF THE INVENTION

Figure 1:
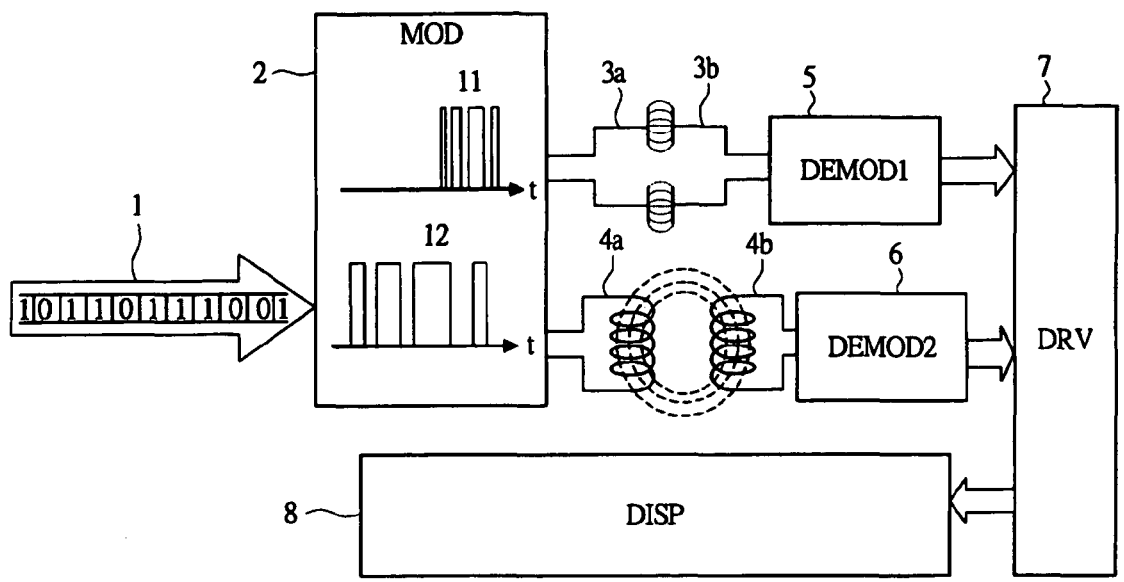
FIG. 1 is a diagram illustrating a configuration of a communication system by electrostatic coupling and electromagnetic induction according to Embodiment 1 of the present invention.

According to embodiments of the present invention, there is realized a communication system by electrostatic coupling and electromagnetic induction (wireless communication system) which is capable of efficiently transmitting, in short-/medium-distance wireless communication, various pieces of information different in quality or quantity from a base station to a terminal station, and has low power consumption as a whole system. Further, it is possible to provide different modes of a stationary (fixed) mode and a mobile (movable) mode for the usage mode of hardware which is a component of the system, such as a display with wireless functions. As a result, remarkably widened application of displays is realized.

Specifically, the communication system by electrostatic coupling and electromagnetic induction according to the embodiments of the present invention is provided with, as non-contact transmission circuits, a transmission circuit utilizing electrostatic coupling and a transmission circuit utilizing electromagnetic induction, and therefore has two different types of transmission modes. When transmission of a larger amount of information is required, or when transmission with higher security or reliability is required, the transmission circuit utilizing the electrostatic coupling is used, and, in other cases, the transmission circuit utilizing the electromagnetic induction is used. It is possible to discriminate differences in quantity or quality of information, including differences in information amount, such as sound, a still picture, and a motion picture, differences in security level, such as disclosable and concealment required, and differences in reliability, such as uncorrectable and correctable, in terms of distance transmissibility and volume transferability. Embodiments 1 and 3 are characterized by the volume transferability, whereas Embodiment 2 is characterized by the distance transmissibility.

Those characteristics are highly consistent with the distance transmissibility and the volume transferability which the electrostatic field and the induction field of an electromagnetic wave have. Information transmission through the electrostatic coupling using the electrostatic field is limited to short distance, and is capable of large amount transmission. Specifically, the information transmission through the electrostatic coupling using the electrostatic field is capable of transmitting a large amount of information over short distance, in other words, capable of transmission with less external leakage. Information transmission using the induction field is capable of medium-distance transmission, which is longer than short-distance transmission, but the quantitative capacity for the information transmission is smaller. Besides, the information is distributed across a medium-distance range, and hence the risk of external leakage of the information increases. Thus, by providing the wireless communication system with both the transmission circuit utilizing the electrostatic coupling and the transmission circuit utilizing the electromagnetic induction, and by switching over between the transmission circuit utilizing the electrostatic coupling and the transmission circuit utilizing the electromagnetic induction in accordance with the amount of information transmission, and the degree of security and reliability at the time of transmission of a plurality of information pieces different in quality or quantity required of the system, it becomes possible to realize a wireless communication system which has smaller power consumption as a whole system.

Further, the communication system according to the embodiments of the present invention performs information transmission through the electrostatic coupling when application thereof requires higher accuracy for the alignment, and performs information transmission through the electromagnetic induction when application thereof requires lower accuracy for the alignment. With this configuration, there are provided different modes of the stationary (fixed) mode and the mobile (movable) mode for the usage mode of a terminal which is a component of the wireless communication system, such as a display with wireless functions. As a result, it becomes possible to widen the application of displays remarkably.

Further, the communication system according to the embodiments of the present invention is capable of transmitting data which requires high speed, large volume, and high reliability, and data which requires low speed, small volume, and low reliability, with an optimum transmission efficiency owing to two transmission circuits utilizing different physical phenomena of the electrostatic coupling and the electromagnetic induction. Hence, it is possible to reduce power consumption as a whole system. In addition, by utilizing differences in the degree of alignment of those transmission circuits, the terminal station which is a component of the system is made available for use in the different modes of the stationary (fixed) mode and the mobile (movable) mode. As a result, it becomes possible to widen the application of the system remarkably.

Hereinbelow, the embodiments of the present invention are described in detail with reference to the drawings. It should be noted that, in all the drawings used for describing the embodiments, the same components are, in principle, denoted by the same reference symbols, and hence repetitive description thereof is omitted. Besides, in each of the embodiments, a featured portion is mainly described, but this does not mean that other portions are irrelevant to one another. Those portions are connected to one another as modification examples, application examples, and supplementary descriptions.

Hereinbelow, Embodiments 1 to 9 are configuration examples of the communication systems by electrostatic coupling and electromagnetic induction, whereas Embodiments 10 to 12 are examples in which the communication system by electrostatic coupling and electromagnetic induction of Embodiments 1 to 9 is applied. Further, when attention is focused on the transmission target in the communication system by electrostatic coupling and electromagnetic induction, Embodiments 1 to 5 are examples of transmitting information, whereas Embodiments 6 to 9 are examples of transmitting energy including information and electric power.

EMBODIMENT 1

Embodiment 1 according to the present invention is described with reference to FIG. 1. FIG. 1 is a diagram illustrating a configuration of a communication system by electrostatic coupling and electromagnetic induction according to Embodiment 1 of the present invention.

The communication system by electrostatic coupling and electromagnetic induction according to this embodiment includes a modulator circuit (MOD) 2 which modulates information of digital series data 1, electrostatic coupling circuits 3a and 3b which are first non-contact transmission circuits in which electrostatic coupling is used for the transmission of the modulated information, electromagnetic induction circuits 4a and 4b which are second non-contact transmission circuits in which electromagnetic induction is used for the transmission of the modulated information, a first demodulator circuit (DEMOD1) 5 which demodulates the information transmitted through the electrostatic coupling, a second demodulator circuit (DEMOD2) 6 which demodulates the information transmitted through the electromagnetic induction, a drive circuit (DRV) 7 which generates drive data using the demodulated information as an input, and a display circuit (DISP) 8 which displays based on the generated drive data.

The electrostatic coupling circuits 3a and 3b include at least a pair of opposite electrodes which are spatially distanced from each other. The electromagnetic induction circuits 4a and 4b include at least a pair of non-contact coils which are spatially distanced from each other. The base station is provided with the electrostatic coupling circuit 3a including one of the opposite electrodes, the electromagnetic induction circuit 4a including one of the non-contact coils, and the modulator circuit 2. The terminal station is provided with the electrostatic coupling circuit 3b including the other of the opposite electrodes, the electromagnetic induction circuit 4b including the other of the non-contact coils, the first demodulator circuit 5, the second demodulator circuit 6, the drive circuit 7, and the display circuit 8.

In the communication system by electrostatic coupling and electromagnetic induction, the modulator circuit 2 is electrically connected to the first demodulator circuit 5 and the second demodulator circuit 6 through the electrostatic coupling circuits 3a and 3b, and the electromagnetic induction circuits 4a and 4b respectively.

Specifically, the digital series data 1 is input to the modulator circuit 2, and, as an output therefrom, when a demodulation result of the digital series data 1 is data 11 for high-speed transmission, the data is transmitted, in a first transmission mode, to the first demodulator circuit 5 via the electrostatic coupling circuits 3a and 3b. On the other hand, when the demodulation result of the digital series data 1 is data 12 for low-speed transmission, the data is transmitted, in a second transmission mode, to the second demodulator circuit 6 via the electromagnetic induction circuits 4a and 4b. Then, those outputs from the first demodulator circuit 5 and the second demodulator circuit 6 are input to the drive circuit 7, and the output from the drive circuit 7 is input to the display circuit 8.

Here, in the case where the transmission modes are discriminated in accordance with the demodulation result of the digital series data 1 as described above, the base station may include a demodulator circuit (not shown). With this configuration, the base station can determine, based on output data from the demodulator circuit, whether the demodulation result is the data 11 for high-speed transmission or the data 12 for low-speed transmission. An example of such a case is when the base station is used as a repeater of the digital series data 1. On the other hand, when the base station is a generation source of the digital series data 1, the base station itself can determine whether the demodulation result is the data 11 for high-speed transmission or the data 12 for low-speed transmission. Thus, there is no need for the demodulator circuit. Incidentally, there exist digital methods and analog methods for the modulation method and the demodulation method, but those methods are well-known technology, and hence description thereof is omitted herein.

As is described above, according to this embodiment, when attention is focused on the transmission speed of information, the first transmission mode which utilizes the electrostatic coupling of the electrostatic coupling circuits 3a and 3b is capable of more efficient space transmission of information over short distance, compared to the second transmission mode which utilizes the electromagnetic induction. Hence, the first transmission mode can efficiently realize high-speed data transmission over short distance. On the other hand, the second transmission mode which utilizes the electromagnetic induction of the electromagnetic induction circuits 4a and 4b is capable of longer-distance space transmission of information, compared to the first transmission mode which utilizes the electrostatic coupling. Hence, the second transmission mode can efficiently realize low-speed data transmission in terms of distance. As a result, it becomes possible to attain optimum distribution between transmission speed property and distance property of data in accordance with the property of data to be transmitted. This enables realization of such a communication system by electrostatic coupling and electromagnetic induction that has lower power consumption as a whole system.

EMBODIMENT 2

Figure 2:
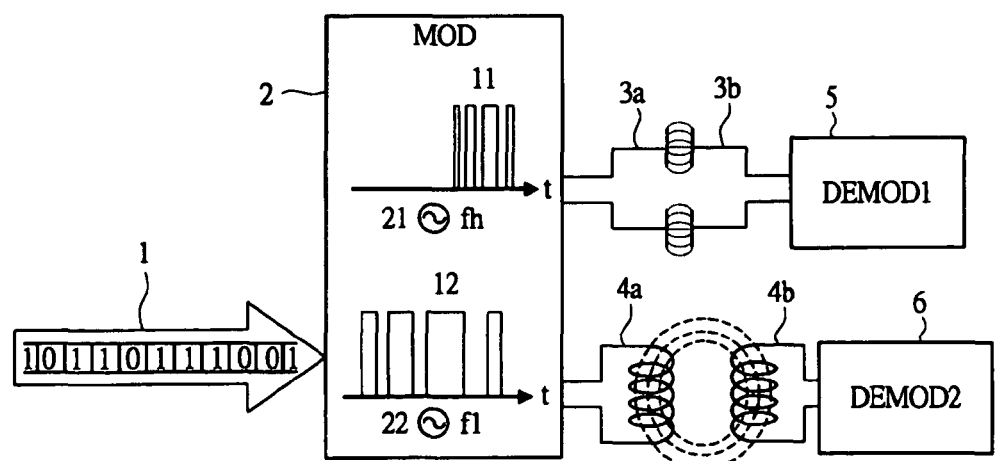
FIG. 2 is a diagram illustrating a configuration of a communication system by electrostatic coupling and electromagnetic induction according to Embodiment 2 of the present invention.

Embodiment 2 according to the present invention is described with reference to FIG. 2. FIG. 2 is a diagram illustrating a configuration of a communication system by electrostatic coupling and electromagnetic induction according to Embodiment 2 of the present invention.

The communication system by electrostatic coupling and electromagnetic induction according to this embodiment is an example in which attention is focused on the frequency of an electromagnetic wave used at the time of transmitting information. A difference from Embodiment 1 illustrated in FIG. 1 is that a first transmission frequency (fh) 21 in a case where the electrostatic coupling circuits 3a and 3b are used is higher than a second transmission frequency (fl) 22 in a case where the electromagnetic induction circuits 4a and 4b are used. It should be noted that, in the embodiments below including this embodiment, when there is no particular need of description, the illustration of the drive circuit 7 and the display circuit 8 clearly illustrated in FIG. 1 according to Embodiment 1 are omitted.

In the communication system by electrostatic coupling and electromagnetic induction according to this embodiment, a wireless transmission element constituted by the opposite electrodes of the electrostatic coupling circuits 3a and 3b may be expressed in a form of series coupling of a capacitance as an equivalent circuit. Thus, by increasing the frequency, the impedance of the capacitance may be decreased, which results in an increased wireless transmission efficiency. On the other hand, a wireless transmission element constituted by the non-contact coils of the electromagnetic induction circuits 4a and 4b may be expressed in a form of series coupling of a mutual inductance as an equivalent circuit. Thus, by decreasing the frequency, the impedance of the inductance may be decreased, which results in an increased wireless transmission efficiency.

As is described above, according to this embodiment, when attention is focused on the frequency of an electromagnetic wave used at the time of transmitting information, in the first transmission mode which utilizes the electrostatic coupling circuits 3a and 3b, the data 11 is transmitted by increasing the transmission frequency 21, whereas in the second transmission mode which utilizes the electromagnetic induction circuits 4a and 4b, the data 12 is transmitted by decreasing the transmission frequency 22. As a result, it is possible to increase the data transmission efficiency as a whole system.

EMBODIMENT 3

Figure 3:
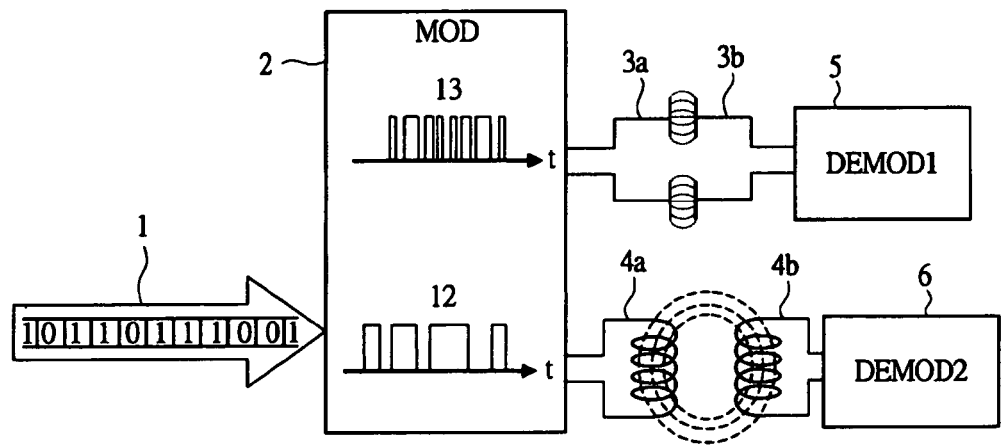
FIG. 3 is a diagram illustrating a configuration of a communication system by electrostatic coupling and electromagnetic induction according to Embodiment 3 of the present invention.

Embodiment 3 according to the present invention is described with reference to FIG. 3. FIG. 3 is a diagram illustrating a configuration of a communication system by electrostatic coupling and electromagnetic induction according to Embodiment 3 of the present invention.

The communication system by electrostatic coupling and electromagnetic induction according to this embodiment is an example in which attention is focused on the transmission volume of information. A difference from Embodiment 1 illustrated in FIG. 1 is that the system has two transmission modes for cases in which data to be transmitted is large volume and is small volume.

In the communication system by electrostatic coupling and electromagnetic induction according to this embodiment, when the demodulation result of the digital series data 1 is data 13 for large-volume transmission, the data is transmitted, in the first transmission mode, to the first demodulator circuit 5 via the electrostatic coupling circuits 3a and 3b. On the other hand, when the demodulation result of the digital series data 1 is data 12 for small-volume transmission, the data is transmitted, in the second transmission mode, to the second demodulator circuit 6 via the electromagnetic induction circuits 4a and 4b.

As is described above, according to this embodiment, it is possible to perform the transmission in an optimum transmission mode in accordance with the size of data to be transmitted.

EMBODIMENT 4

Figure 4:
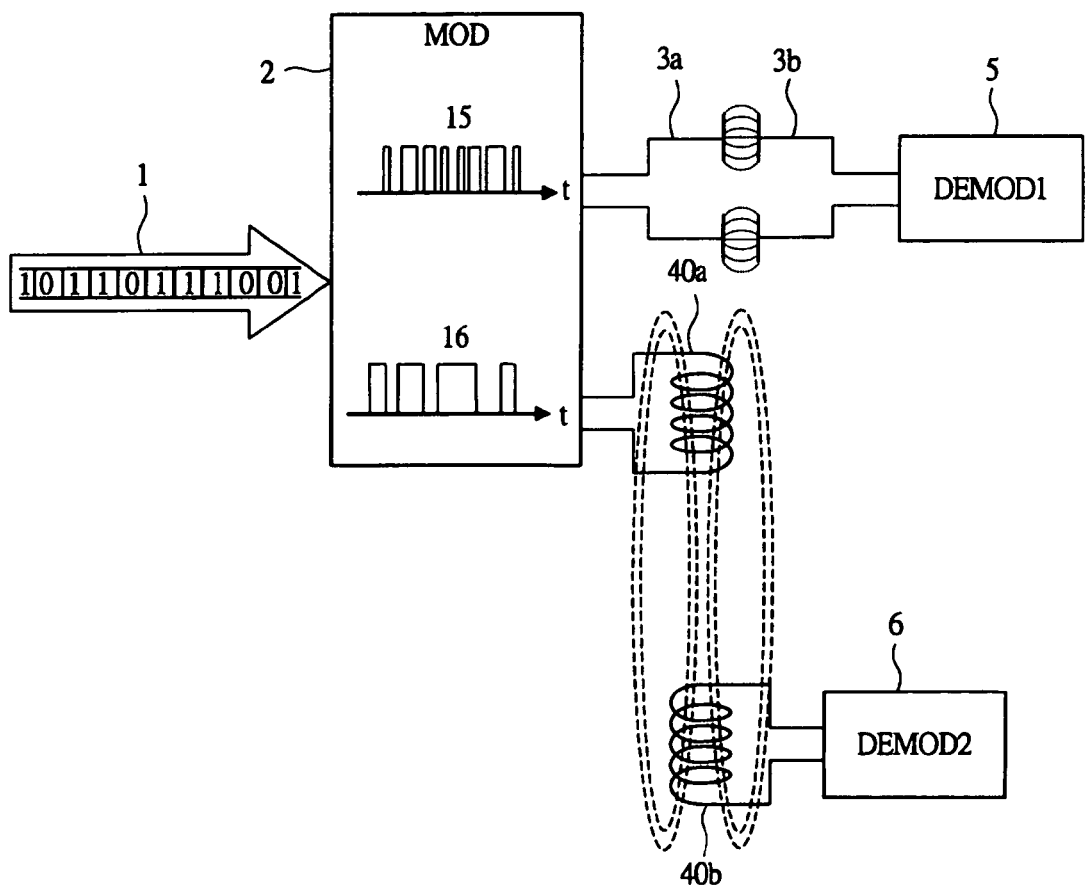
FIG. 4 is a diagram illustrating a configuration of a communication system by electrostatic coupling and electromagnetic induction according to Embodiment 4 of the present invention.

Embodiment 4 according to the present invention is described with reference to FIG. 4. FIG. 4 is a diagram illustrating a configuration of a communication system by electrostatic coupling and electromagnetic induction according to Embodiment 4 of the present invention.

The communication system by electrostatic coupling and electromagnetic induction according to this embodiment is an example in which attention is focused on the transmission distance of information. A difference from Embodiment 1 illustrated in FIG. 1 is that the system has two transmission modes for cases in which the transmission distance of data to be transmitted is short distance and in which that is long distance.

In the communication system by electrostatic coupling and electromagnetic induction according to this embodiment, when the demodulation result of the digital series data 1 is data 15 for short-distance transmission, the data is transmitted, in the first transmission mode, to the first demodulator circuit 5 via the electrostatic coupling circuits 3a and 3b. On the other hand, when the demodulation result of the digital series data 1 is data 16 for long-distance transmission, the data is transmitted, in the second transmission mode, to the second demodulator circuit 6 via electromagnetic induction circuits 40a and 40b.

As is described above, according to this embodiment, when attention is focused on the transmission distance of information, the distance within which data transmission is possible through the electromagnetic induction is longer than the distance within which data transmission is possible through the electrostatic coupling. Hence, it becomes possible to attain optimum distribution between transmission speed property and distance property of data in accordance with the property of data to be transmitted. This enables realization of such a communication system by electrostatic coupling and electromagnetic induction that has lower power consumption as a whole system.

EMBODIMENT 5

Figure 5:
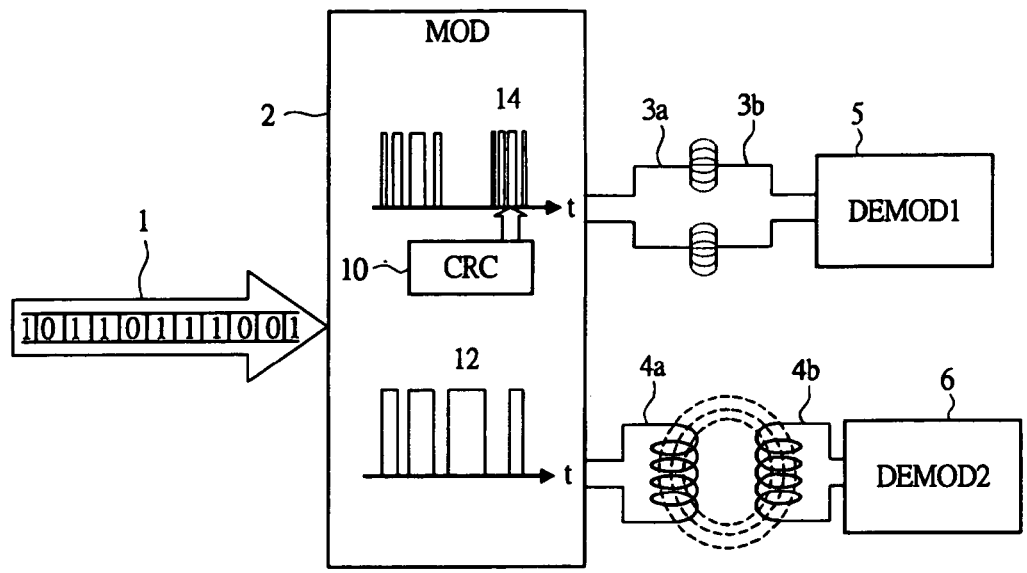
FIG. 5 is a diagram illustrating a configuration of a communication system by electrostatic coupling and electromagnetic induction according to Embodiment 5 of the present invention.

Embodiment 5 according to the present invention is described with reference to FIG. 5. FIG. 5 is a diagram illustrating a configuration of a communication system by electrostatic coupling and electromagnetic induction according to Embodiment 5 of the present invention.

The communication system by electrostatic coupling and electromagnetic induction according to this embodiment is an example in which attention is focused on the degree of security of information. A difference from Embodiment 1 illustrated in FIG. 1 is that the modulator circuit 2 is provided with an error-correction code circuit (CRC) 10 and that the system has a transmission mode of high reliability.

In the communication system by electrostatic coupling and electromagnetic induction according to this embodiment, when the demodulation result of the digital series data 1 is data 14 for high-reliability transmission, the data 14 to be transmitted is added with an error-correction code by the error-correction code circuit 10, and then is transmitted, in the first transmission mode, to the first demodulator circuit 5 via the electrostatic coupling circuits 3a and 3b. On the other hand, when the demodulation result of the digital series data 1 is data 12 which is not for high-reliability transmission, the data 12 is transmitted, in the second transmission mode, to the second demodulator circuit 6 via the electromagnetic induction circuits 4a and 4b.

As is described above, according to this embodiment, when attention is focused on the degree of security of information, the transmission distance is short inevitably due to the use of the electrostatic coupling, and, at the same time, confidentiality against wireless eavesdropping by another person is also enhanced. Hence, in transmission of data having high reliability, there is achieved an effect of enhancing confidentiality and safety. Further, the data added with the error-correction function has a larger amount of information than the original data, but large-volume data is suitable to the communication through the electrostatic coupling, which is capable of high-speed data transmission.

EMBODIMENT 6

Figure 6:
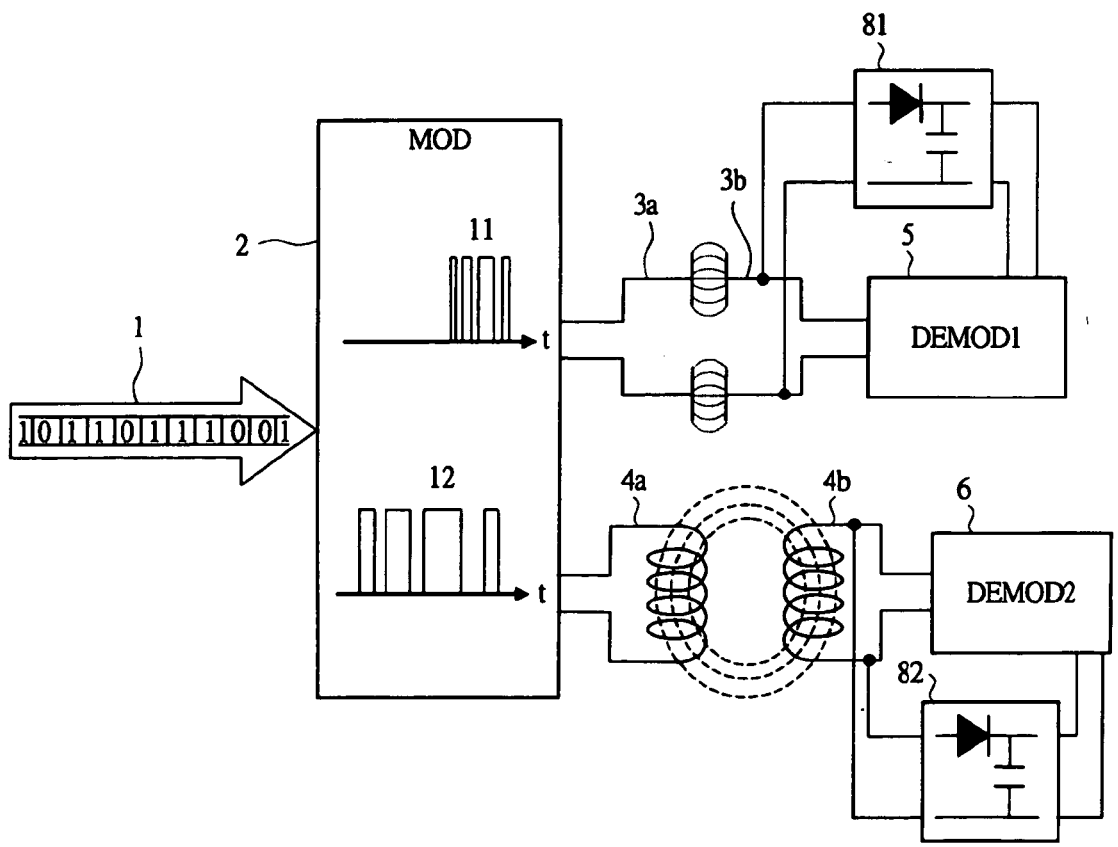
FIG. 6 is a diagram illustrating a configuration of a communication system by electrostatic coupling and electromagnetic induction according to Embodiment 6 of the present invention.

Embodiment 6 according to the present invention is described with reference to FIG. 6. FIG. 6 is a diagram illustrating a configuration of a communication system by electrostatic coupling and electromagnetic induction according to Embodiment 6 of the present invention.

The communication system by electrostatic coupling and electromagnetic induction according to this embodiment is an example in which energy including power as well as the information described in Embodiments 1 to 5 illustrated in FIGS. 1 to 5 is transmitted. A difference from Embodiment 1 illustrated in FIG. 1 is that a first rectifying circuit 81 is added between the electrostatic coupling circuits 3a and 3b and the first demodulator circuit 5 in a parallel manner, and that a second rectifying circuit 82 is added between the electromagnetic induction circuits 4a and 4b and the second demodulator circuit 6 in a parallel manner.

In the communication system by electrostatic coupling and electromagnetic induction according to this embodiment, the first rectifying circuit 81 and the second rectifying circuit 82 are configured by independent rectifying circuits which are electrically coupled in parallel to the electrostatic coupling circuit 3b and the electromagnetic induction circuit 4b, respectively. The first rectifying circuit 81 and the second rectifying circuit 82 are provided with functions of obtaining power for the terminal station to use, from the energy transmitted through the electrostatic coupling in the first transmission mode and the energy transmitted through the electromagnetic induction in the second transmission mode, respectively.

As is described above, according to this embodiment, it is possible to supply power along with data (information) from the base station to the terminal station, and hence a terminal station which has no power supply such as a battery may be realized, which therefore enables downsizing of the terminal station. At the same time, the safety level may be improved against destruction of a device, pollution, and the like due to chemical reaction.

EMBODIMENT 7

Figure 7:
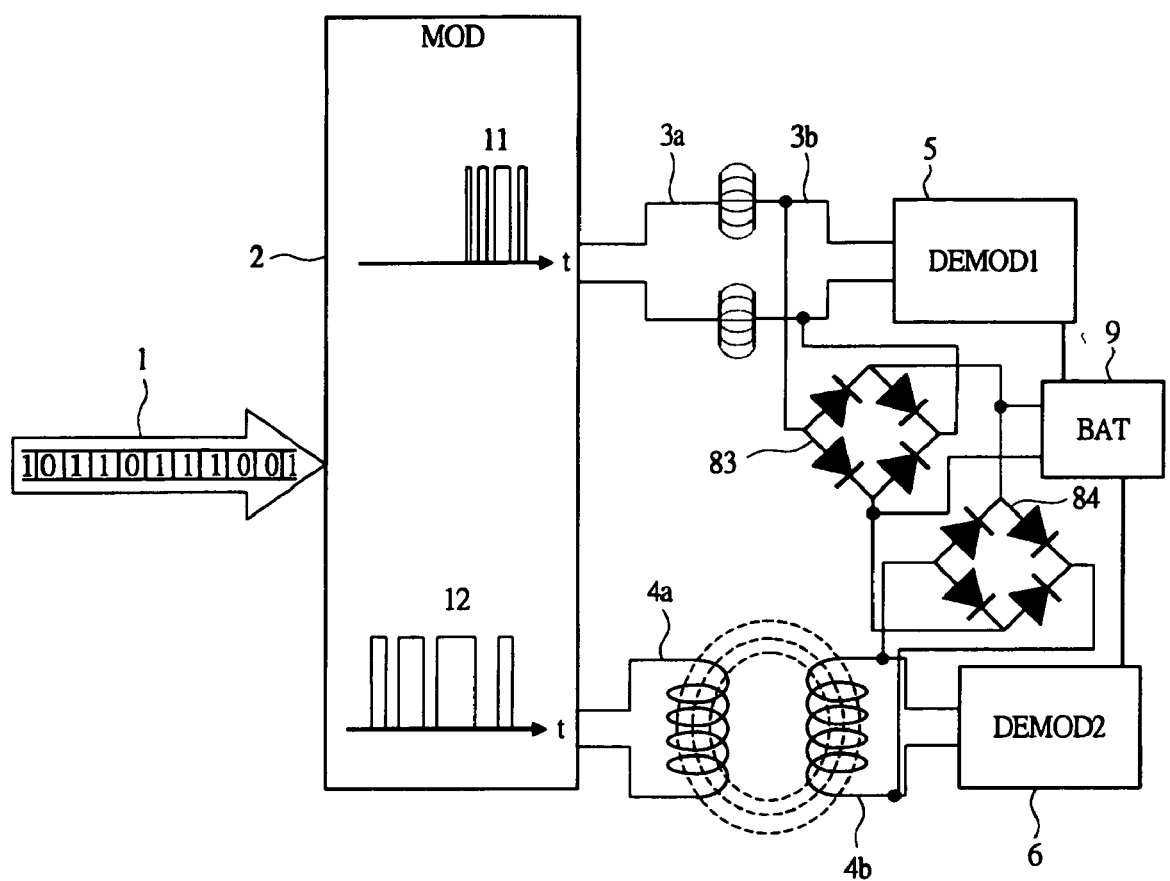
FIG. 7 is a diagram illustrating a configuration of a communication system by electrostatic coupling and electromagnetic induction according to Embodiment 7 of the present invention.

Embodiment 7 according to the present invention is described with reference to FIG. 7. FIG. 7 is a diagram illustrating a configuration of a communication system by electrostatic coupling and electromagnetic induction according to Embodiment 7 of the present invention.

The communication system by electrostatic coupling and electromagnetic induction according to this embodiment is an example in which the rectifying circuits are configured by diode bridges, and those rectifying circuits are provided with a battery electrically coupled thereto. A difference from Embodiment 6 illustrated in FIG. 6 is that the first rectifying circuit 81 and the second rectifying circuit 82 are replaced with a first diode bridge 83 and a second diode bridge 84, respectively, and are provided with a battery (BAT) 9.

In the communication system by electrostatic coupling and electromagnetic induction according to this embodiment, the first diode bridge 83 and the second diode bridge 84 are electrically coupled in parallel to the electrostatic coupling circuit 3b and the electromagnetic induction circuit 4b, respectively. The outputs from the first diode bridge 83 and the second diode bridge 84 are connected to the battery 9. The battery 9 is connected to the first demodulator circuit 5 and the second demodulator circuit 6. With this configuration, the outputs from the first diode bridge 83 and the second diode bridge 84 are stored in the battery 9, and then, the battery 9 provides power for such electrical/electronic circuits as the first demodulator circuit 5 and the second demodulator circuit 6.

As is described above, according to this embodiment, similarly to Embodiment 6 illustrated in FIG. 6, it is possible to supply power along with data (information) from the base station to the terminal station. At the same time, due to the fact that the terminal station can receive data and power from the base station without having a fixed ground potential, it is possible to increase the degree of freedom as to the installation location and installation form of the terminal station.

EMBODIMENT 8

Figure 8:
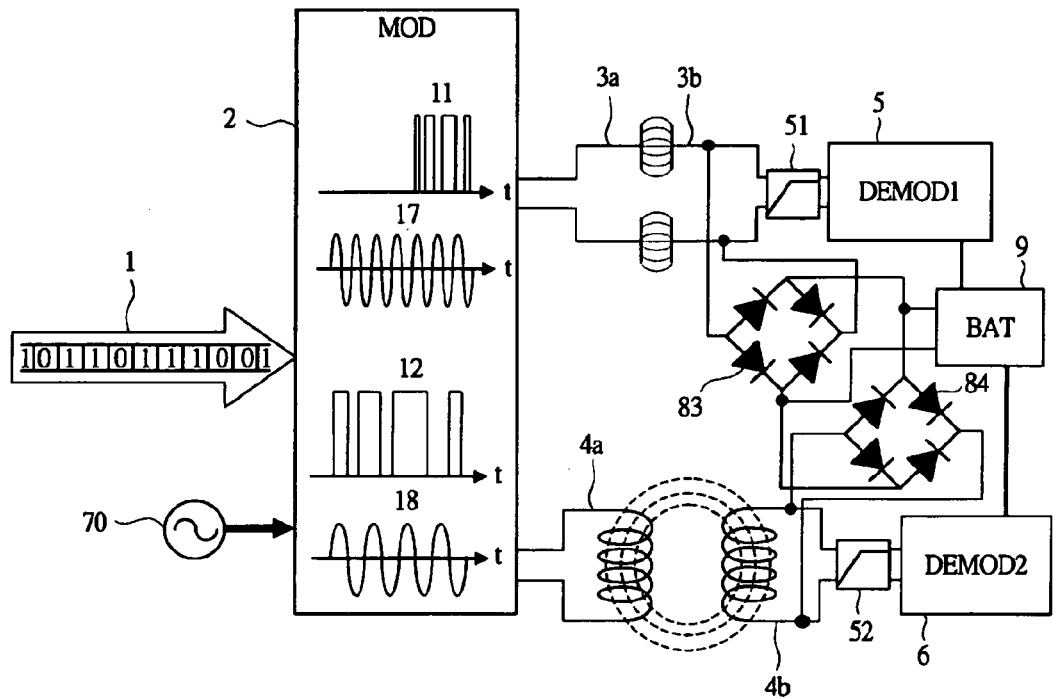
FIG. 8 is a diagram illustrating a configuration of a communication system by electrostatic coupling and electromagnetic induction according to Embodiment 8 of the present invention.

Embodiment 8 according to the present invention is described with reference to FIG. 8. FIG. 8 is a diagram illustrating a configuration of a communication system by electrostatic coupling and electromagnetic induction according to Embodiment 8 of the present invention.

The communication system by electrostatic coupling and electromagnetic induction according to this embodiment is an example in which filters are provided. A difference from Embodiment 7 illustrated in FIG. 7 is that a first filter 51 and a second filter 52 are inserted between the electrostatic coupling circuit 3b and the first demodulator circuit 5 and between the electromagnetic induction circuit 4b and the second demodulator circuit 6, respectively, and that the base station is provided with a carrier generating circuit 70 which generates a power supply carrier, and superimposes the power supply carrier onto data.

In the communication system by electrostatic coupling and electromagnetic induction according to this embodiment, as the output from the modulator circuit 2, a first power supply carrier 17 and a second power supply carrier 18 which are generated in the carrier generating circuit 70 may be superimposed onto the data 11 and the data 12, respectively, and then, the resultant data is transmitted. The first power supply carrier 17 and the second power supply carrier 18 each have an extremely narrow band frequency spectrum on the frequency axis, and therefore may be separated easily from the data to be transmitted from the base station to the terminal station by the first filter 51 and the second filter 52 provided to the terminal station.

As is described above, according to this embodiment, compared to Embodiment 7 illustrated in FIG. 7, the base station can transmit to the terminal station more power which is used for driving the electrical/electronic circuits constituting the terminal station, and hence it becomes possible to mount a wider variety of electrical/electronic circuits onto the terminal station. As a result, functions of the terminal station may be improved.

EMBODIMENT 9

Figure 9:
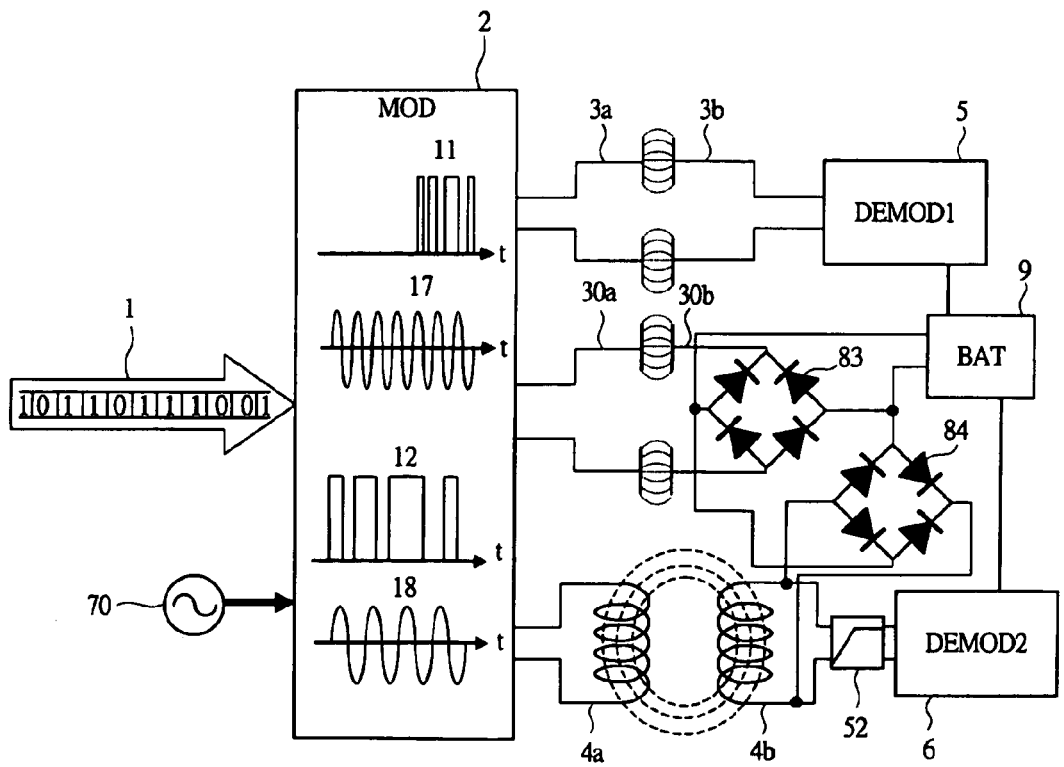
FIG. 9 is a diagram illustrating a configuration of a communication system by electrostatic coupling and electromagnetic induction according to Embodiment 9 of the present invention.

Embodiment 9 according to the present invention is described with reference to FIG. 9. FIG. 9 is a diagram illustrating a configuration of a communication system by electrostatic coupling and electromagnetic induction according to Embodiment 9 of the present invention.

The communication system by electrostatic coupling and electromagnetic induction according to this embodiment is an example in which two systems of the electrostatic coupling circuits are provided. A difference from Embodiment 8 illustrated in FIG. 8 is that electrostatic coupling circuits 30a and 30b are inserted between the modulator circuit 2 and the first diode bridge 83, and that the electrostatic coupling circuit 3b is not coupled to the first diode bridge 83, and does not include the filter 51.

In the communication system by electrostatic coupling and electromagnetic induction according to this embodiment, the modulator circuit 2 directly transmits data to the first demodulator circuit 5 through the electrostatic coupling circuits 3a and 3b, whereas power is transmitted to the first diode bridge 83 through the second electrostatic coupling circuits 30a and 30b. Then, since the output from the first diode bridge 83 and the output from the second diode bridge 84 of the electromagnetic induction circuits 4a and 4b store in the battery 9, power for such electrical/electronic circuits as the first demodulator circuit 5 and the second demodulator circuit 6 may be provided.

As is described above, according to this embodiment, compared to Embodiment 8 illustrated in FIG. 8, because power is supplied using the second electrostatic coupling circuits 30a and 30b which are designed for exclusive use, it is possible to remarkably reduce the influence of the power supply carrier 17 on the data 11. In particular, in the data transmission mode using the electrostatic coupling circuits 3a and 3b, it is possible to perform the data transmission with high speed, large volume, and high reliability.

EMBODIMENT 10

Figure 10:
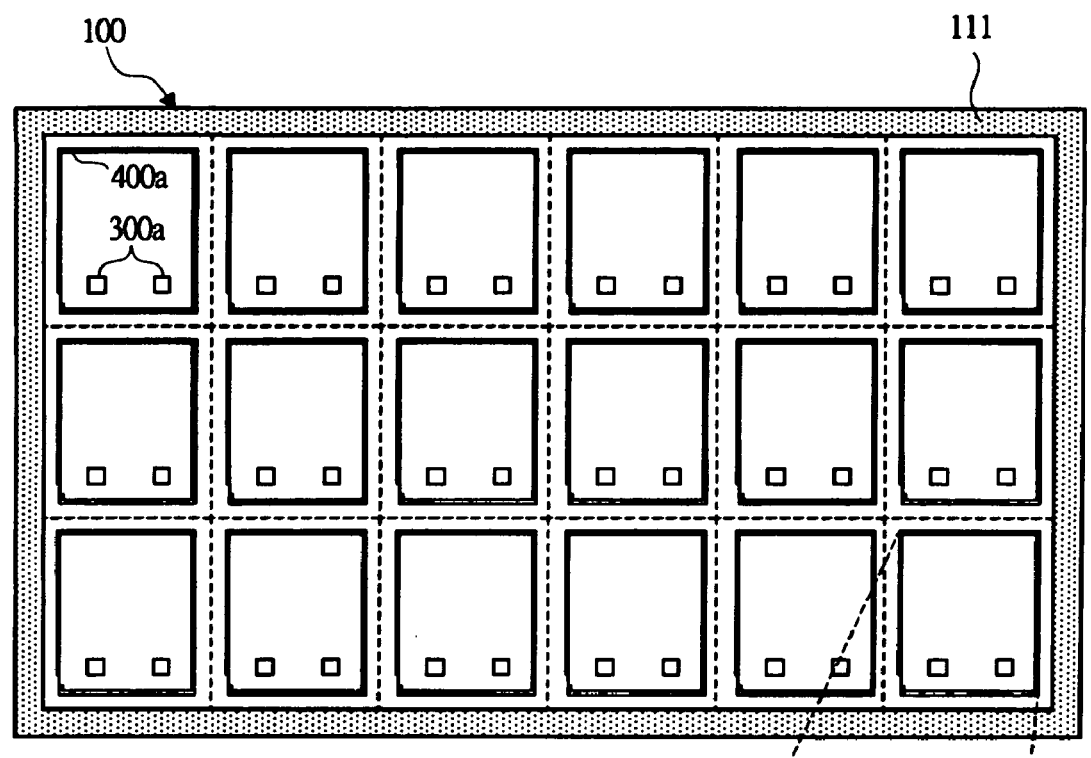
FIG. 10 is a diagram illustrating a configuration of a large-screen display system to which the communication system by electrostatic coupling and electromagnetic induction is applied according to Embodiment 10 of the present invention.
Figure 10:
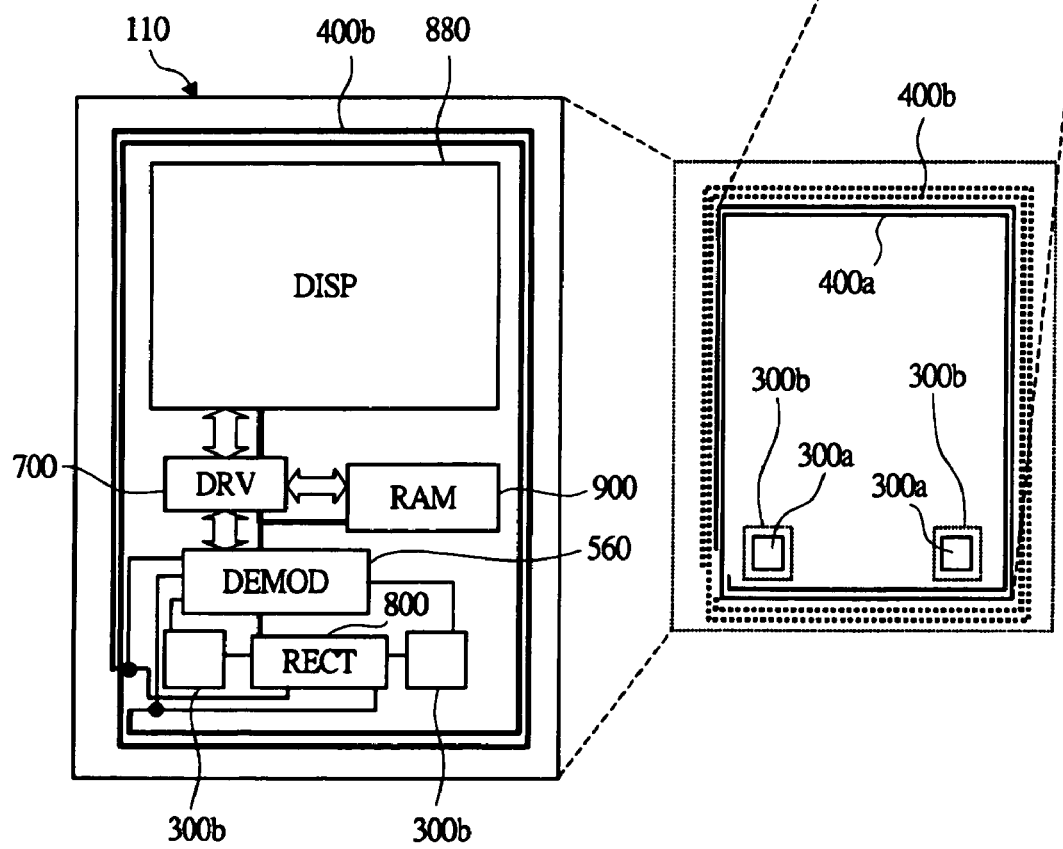

Embodiment 10 according to the present invention is described with reference to FIG. 10. FIG. 10 is a diagram illustrating a configuration of a large-screen display system to which the communication system by electrostatic coupling and electromagnetic induction is applied according to Embodiment 10 of the present invention.

This embodiment is an example in which the communication system by electrostatic coupling and electromagnetic induction according to the embodiments illustrated in FIGS. 1 to 9 is applied to the large-screen display system which includes block display panels.

The large-screen display system according to this embodiment includes a base station 100 which transmits energy containing information and power, and a plurality of terminal stations 110 which are transmission targets of the energy. For the base station 100 and the terminal stations 110, the communication systems by electrostatic coupling and electromagnetic induction according to Embodiments 1 to 9 illustrated in FIGS. 1 to 9 are employed.

Each of the terminal stations 110 is provided with a flat display (DISP) 880 which is such an image display device as a liquid crystal display, a drive circuit (DRV) 700, a memory (RAM) 900, a demodulator circuit group (DEMOD) 560, a rectifying circuit group (RECT) 800, a pair of conductor plates 300b for electrostatic coupling, and a coil 400b for electromagnetic induction. With regard to the structure of each terminal station 110, the flat display 880 uses an entire surface of the front side of the terminal station 110 as a display surface, and the pair of conductor plates 300b for electrostatic coupling is placed on the back side of the flat display 880. Further, the coil 400b for electromagnetic induction is placed, in such a manner as to surround the flat display 880, on a plane which is in parallel with a plane on which the flat display 880 is placed.

In each of the terminal stations 110, the pair of conductor plates 300b for electrostatic coupling and the coil 400b for electromagnetic induction are coupled to the rectifying circuit group 800 and the demodulator circuit group 560 in a parallel manner. The data and the power supply carrier which are transmitted from the base station 100 are subjected to rectification and demodulation in accordance with the respective transmission modes. The rectifying circuit group 800 supplies power to the drive circuit 700, the flat display 880, the memory 900, and the demodulator circuit group 560. The output from the demodulator circuit group 560 is displayed on the flat display 880 by the drive circuit 700.

In the base station 100, in order to correspond to the plurality of terminal stations 110, a pair of conductor plates 300a for electrostatic coupling and a coil 400a for electromagnetic induction are arranged in array inside a fixed frame 111. The area of the conductor plate 300a for electrostatic coupling of the base station 100 is smaller than the area of the conductor plate 300b for electrostatic coupling of the terminal station 110.

With this configuration, the plurality of terminal stations 110 (eighteen in FIG. 10) are arranged in an orderly manner owing to the fixed frame 111 of the base station 100, whereby the pair of conductor plates 300a for electrostatic coupling provided to the base station 100 and the pair of conductor plates 300b for electrostatic coupling provided to each of the terminal stations 110 are kept aligned, and also, the coil 400a for electromagnetic induction provided to the base station 100 and the coil 400b for electromagnetic induction provided to each of the terminal stations 110 are kept aligned.

It should be noted that, in this embodiment, to give the correspondence with Embodiments 1 to 9 illustrated in FIGS. 1 to 9, the opposite electrodes of the electrostatic coupling circuits 3a and 3b correspond to the conductor plates 300a and 300b for electrostatic coupling, and the non-contact coils of the electromagnetic induction circuits 4a and 4b correspond to the coils 400a and 400b for electromagnetic induction. Further, the display circuit 8 corresponds to the flat display 880; the drive circuit 7 corresponds to the drive circuit 700; the first demodulator circuit 5 and second demodulator circuits 6 corresponds to the demodulator circuit group 560; the first rectifying circuits 81 and second rectifying circuits 82 corresponds to the rectifying circuit group 800.

As is described above, according to this embodiment, use of the small-size flat displays 880 enables large-screen display. In addition, because signals and power are supplied to the small-size flat displays 880 in an electrically non-contact manner, it is possible to improve ease of maintenance with respect to the large-screen display system at the time of breakdown of a small-size display, and, at the same time, it is also possible to improve safety, lifetime, and reliability of the system owing to the elimination of electrical contact structure.

EMBODIMENT 11

Figure 11:
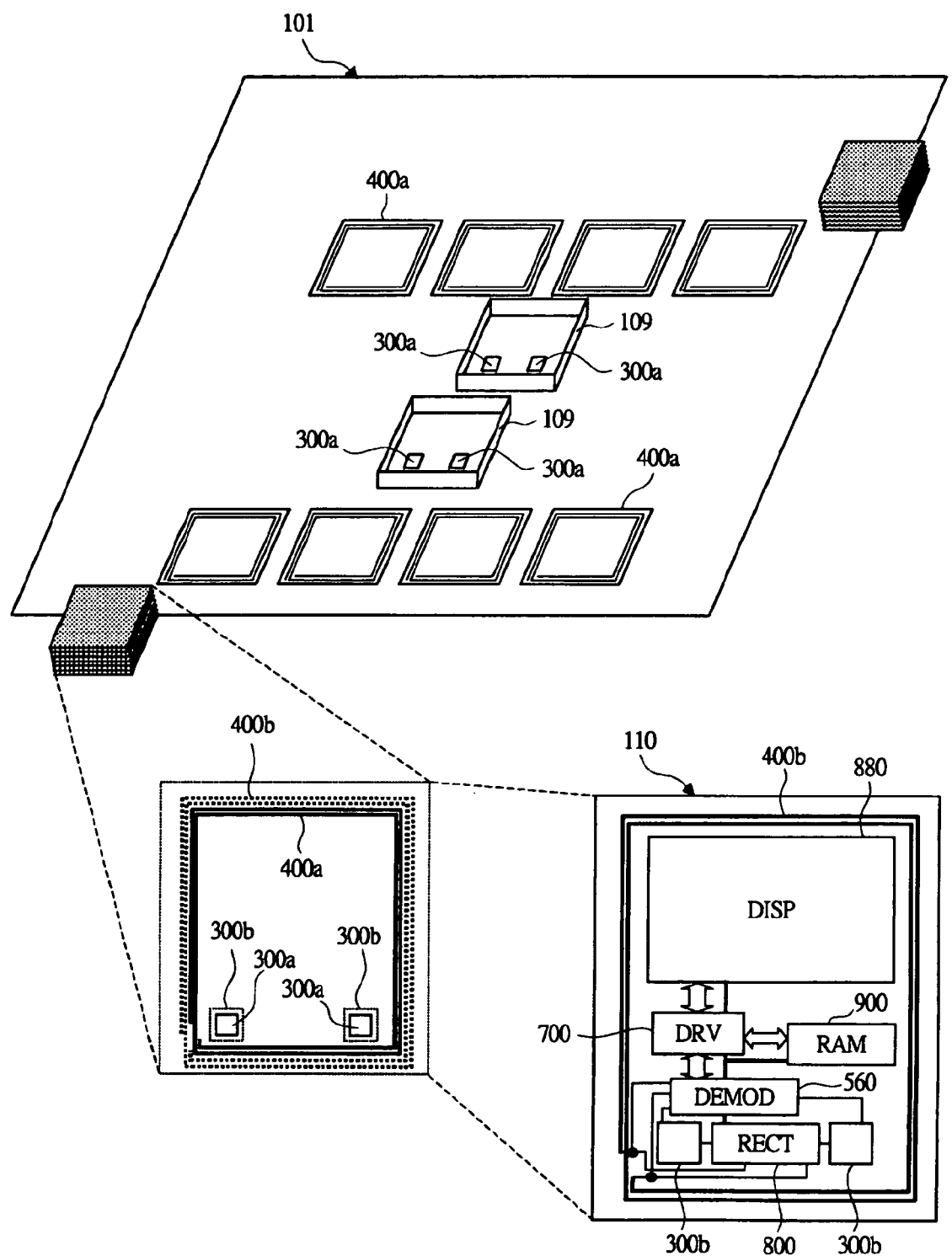
FIG. 11 is a diagram illustrating a configuration of a card game match system to which the communication system by electrostatic coupling and electromagnetic induction is applied according to Embodiment 11 of the present invention.

Embodiment 11 according to the present invention is described with reference to FIG. 11. FIG. 11 is a diagram illustrating a configuration of a card game match system to which the communication system by electrostatic coupling and electromagnetic induction is applied according to Embodiment 11 of the present invention.

This embodiment is an example in which the communication system by electrostatic coupling and electromagnetic induction according to the embodiments illustrated in FIGS. 1 to 9 is applied to the card game match system.

In the card game match system according to this embodiment, the configuration of each terminal station 110 is fundamentally similar to the configuration of the terminal station 110 of Embodiment 10 illustrated in FIG. 10. Further, a base station 101 has a game board function, and also has a plurality of areas in which the coils 400a for electromagnetic induction are arranged, and areas in which the conductor plates 300a for electrostatic coupling are arranged. For the area in which the conductor plates 300a for electrostatic coupling are arranged, there is provided a guide frame 109 so as to secure positional alignment of the terminal station 110 serving as a card and the conductor plates 300b for electrostatic coupling inside that area.

In the card game match system, the respective terminal stations 110 of both players are stacked in corners as so-called undisclosed cards, which do not perform any function in an area in which neither conductor plate 300a for electrostatic coupling nor coil 400a for electromagnetic induction of the base station 101 are present. During the execution of the game, a terminal station 110 which has been selected for a battle is placed, with relatively loose alignment, in an area in which the coil 400a for electromagnetic induction of the base station 101 is present. Then, low-speed data is transmitted from the base station 101 to the terminal station 110 by this coil 400a for electromagnetic induction, and an image is displayed on the flat display 880 of the terminal station 110 as a still picture. A terminal station 110 which has been selected as a battle card is placed using the guide frame 109 on the base station 101 with precise alignment, and high-speed and large-volume data is transmitted from the base station 101 via the conductor plates 300a for electrostatic coupling. Then, a motion picture is displayed on the flat display 880 of the terminal station 110, thereby enhancing realistic sensation during the game.

As is described above, according to this embodiment, the base station 101 is provided with the guide frame 109 for specifying the position of the terminal station 110. The conductor plates 300b for electrostatic coupling of the terminal station 110 are positionally aligned with the conductor plates 300a for electrostatic coupling of the base station 101 by the guide frame 109. On the other hand, positional alignment between the coil 400b for electromagnetic induction of the terminal station 110 and the coil 400a for electromagnetic induction of the base station 101 may be performed with a low degree of precision. As a result, it is possible to provide a novel match game which has high realistic sensation.

EMBODIMENT 12

Figure 12:
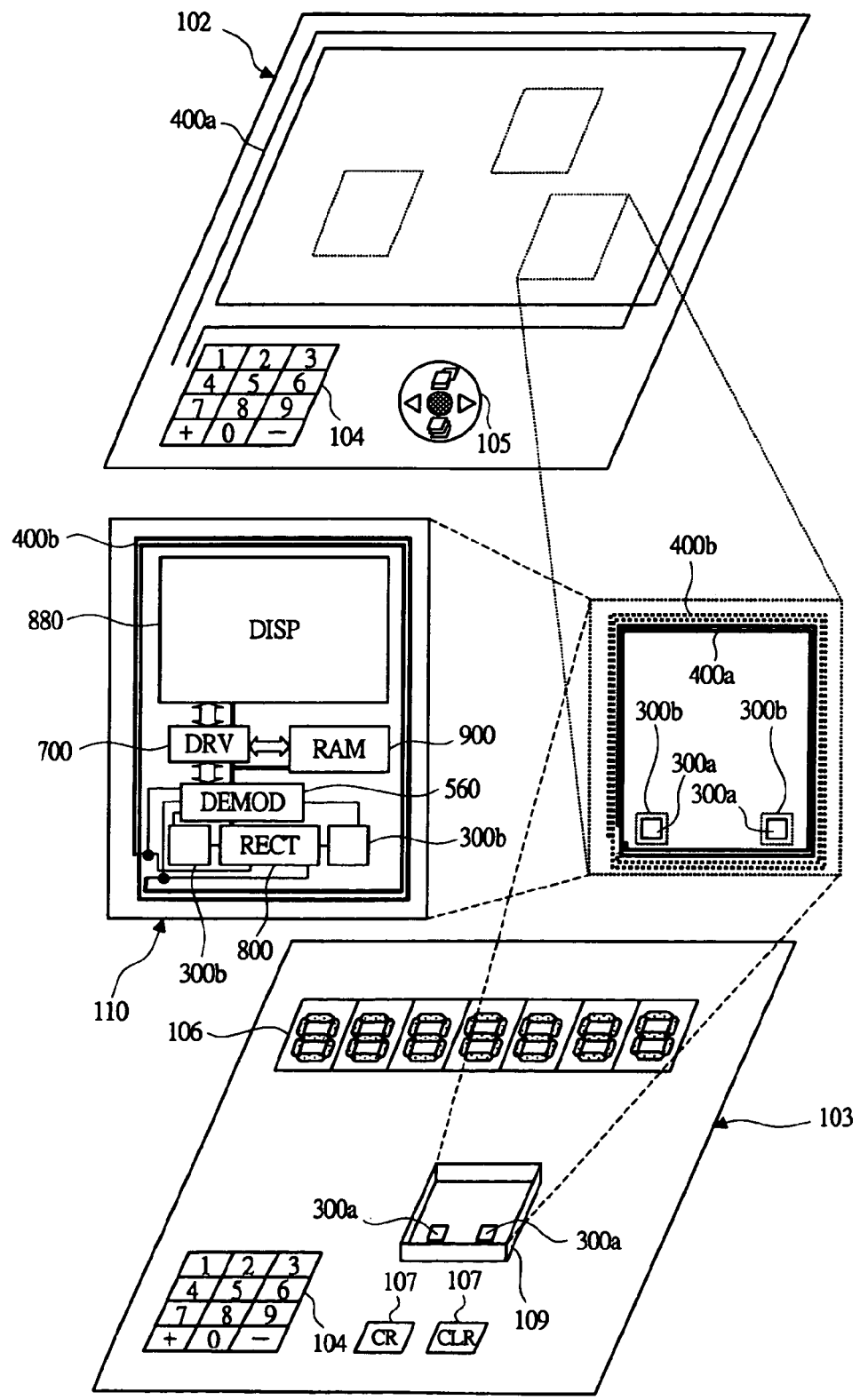
FIG. 12 is a diagram illustrating a configuration of an order and cash-register system to which the communication system by electrostatic coupling and electromagnetic induction is applied according to Embodiment 12 of the present invention.

Embodiment 12 according to the present invention is described with reference to FIG. 12. FIG. 12 is a diagram illustrating a configuration of an order and cash-register system to which the communication system by electrostatic coupling and electromagnetic induction is applied according to Embodiment 12 of the present invention.

This embodiment is an example in which the communication system by electrostatic coupling and electromagnetic induction according to the embodiments illustrated in FIGS. 1 to 9 is applied to the order and cash-register system used in retailing or a restaurant.

In the order and cash-register system according to this embodiment, the configuration of the terminal station 110 is fundamentally similar to the configuration of the terminal station 110 of Embodiment 10 illustrated in FIG. 10. Further, a first base station 102 has a menu function and functions of an order machine, and an order area in which a large-diameter coil 400a for electromagnetic induction is arranged. The first base station 102 is also provided with a numerical keypad 104 and a joystick 105 for supporting order tasks. A second base station 103 has a cash-register function, and is provided with a numeric display device 106, the numerical keypad 104, a plurality of input keys 107, and the guide frame 109 containing the conductor plates 300a for electrostatic coupling.

In the order and cash-register system, a customer who is to be provided with service receives the terminal station 110 at the beginning of the service. Then, the customer receives information regarding the service contents (e.g., descriptions of food and goods) from the data transmitted to the terminal station 110 through the electromagnetic induction in the first base station 102, and decides what service (e.g., food order and provisional acquisition of goods) the customer desires to receive. Then, the first base station 102 writes a decision content (e.g., ID, sum, and number of purchased commodities) in the memory 900 of the terminal station 110 by using the power obtained through the electromagnetic induction. At the end of the service, the customer puts the terminal station 110 into the guide frame 109 of the base station 103 serving as a cash register in order to load the content from the memory 900 with high reliability and high speed through the electrostatic coupling. Then, after information processing, the customer receives a billing service, which is the most important to the customer, and requires high reliability.

As is described above, according to this embodiment, it is possible to promote application of displays to global consumer markets which are relevant to a variety of systems which have taken root in regular social life, and have huge scale potential. In the beginning of service or during the process of the service, those systems do not require high reliability and high speed between the base station 102 and the terminal station 110. In other words, the systems demand processing which is correctable and allows for a waiting time. On the other hand, at the end of the service, the systems require high reliability and high speed between the base station 103 and the terminal station 110. In other words, the systems demand processing which is uncorrectable and needs to deal with the queue with high speed.

While there have been described what are at present considered to be certain embodiments of the invention, it will be understood that various modifications may be made thereto, and it is intended that the appended claims cover all such modifications as fall within the scope of the invention.

For example, applications of the communication system by electrostatic coupling and electromagnetic induction according to the present invention are not limited to the large-screen display system, the card game match system, and the order and cash-register system as described in Embodiments 10 to 12. It is possible to provide a use mode of a terminal station which includes a display with a wireless function in a variety of different modes, such as a stationary (fixed) mode and a mobile (movable) mode. As a result, application of a display may be broadened considerably.

What is claimed is:

1. A communication system by electrostatic coupling and electromagnetic induction, the communication system comprising:
   a first transmission part for transmitting first information through non-contact communication using electrostatic coupling;
   a first reception part for receiving the first information through the non-contact communication using the electrostatic coupling;
   a second transmission part for transmitting second information through non-contact communication using electromagnetic induction; and
   a second reception part for receiving the second information through the non-contact communication using the electromagnetic induction, and
   wherein the first transmission part and the first reception part are formed of electrodes which are placed in an opposed manner,
   wherein the second transmission part and the second reception part are each formed of a coil, and
   wherein the non-contact communication using the electrostatic coupling has a higher communication speed than the non-contact communication using the electromagnetic induction.

2. The communication system by electrostatic coupling and electromagnetic induction according to claim 1, wherein the coil of the second transmission part has a cross-sectional area which is larger than a cross-sectional area of the coil of the second reception part, so that a communication area of the non-contact communication using the electromagnetic induction becomes larger.

3. A communication system by electrostatic coupling and electromagnetic induction, the communication system comprising:
   a first transmission part for transmitting first information through non-contact communication using electrostatic coupling;
   a first reception part for receiving the first information through the non-contact communication using the electrostatic coupling;
   a second transmission part for transmitting second information through non-contact communication using electromagnetic induction; and
   a second reception part for receiving the second information through the non-contact communication using the electromagnetic induction, and
   wherein the first transmission part and the first reception part are formed of electrodes which are placed in an opposed manner,
   wherein the second transmission part and the second reception part are each formed of a coil, and
   wherein a frequency of an electromagnetic wave used for the non-contact communication using the electrostatic coupling is higher than a frequency of an electromagnetic wave used for the non-contact communication using the electromagnetic induction.

4. A communication system by electrostatic coupling and electromagnetic induction, the communication system comprising:
   a first transmission part for transmitting first information through non-contact communication using electrostatic coupling;
   a first reception part for receiving the first information through the non-contact communication using the electrostatic coupling;
   a second transmission part for transmitting second information through non-contact communication using electromagnetic induction; and
   a second reception part for receiving the second information through the non-contact communication using the electromagnetic induction, and
   wherein the first transmission part and the first reception part are formed of electrodes which are placed in an opposed manner,
   wherein the second transmission part and the second reception part are each formed of a coil, and
   wherein the non-contact communication using the electromagnetic induction has a larger communication area than the non-contact communication using the electrostatic coupling.

5. A communication system by electrostatic coupling and electromagnetic induction, the communication system comprising:
   a first transmission part for transmitting first information through non-contact communication using electrostatic coupling;
   a first reception part for receiving the first information through the non-contact communication using the electrostatic coupling;
   a second transmission part for transmitting second information through non-contact communication using electromagnetic induction;
   a second reception part for receiving the second information through the non-contact communication using the electromagnetic induction; and a selection part for selecting any one of the non-contact communication using the electrostatic coupling and the non-contact communication using the electromagnetic induction, and wherein the first transmission part and the first reception part are formed of electrodes which are placed in an opposed manner, wherein the second transmission part and the second reception part are each formed of a coil, and wherein the selection part selects the non-contact communication using the electrostatic coupling, when it is determined that data requires high reliability.

6. A communication system by electrostatic coupling and electromagnetic induction, the communication system comprising:

a first transmission part for transmitting first information through non-contact communication using electrostatic coupling;

a first reception part for receiving the first information through the non-contact communication using the electrostatic coupling;

a second transmission part for transmitting second information through non-contact communication using electromagnetic induction;

a second reception part for receiving the second information through the non-contact communication using the electromagnetic induction; and a power obtaining part for obtaining power from a frequency signal received by at least one of the first reception part and the second reception part, and wherein the first transmission part and the first reception part are formed of electrodes which are placed in an opposed manner, wherein the second transmission part and the second reception part are each formed of a coil.

7. The communication system by electrostatic coupling and electromagnetic induction according to claim 6, wherein the power obtaining part comprises a rectifying circuit.

8. The communication system by electrostatic coupling and electromagnetic induction according to claim 7, further comprising:

a battery which is electrically coupled to the rectifying circuit, wherein the battery stores the obtained power.

9. The communication system by electrostatic coupling and electromagnetic induction according to claim 7, wherein the power obtaining part comprises a diode bridge.

10. The communication system by electrostatic coupling and electromagnetic induction according to claim 6, further comprising: a filter part which are electrically connected to any one of the first reception part and the second reception part, and pass frequency components within a predetermined band width.

11. A communication system by electrostatic coupling and electromagnetic induction, the communication system comprising:

a first transmission part for transmitting first information through non-contact communication using electrostatic coupling;

a first reception part for receiving the first information through the non-contact communication using the electrostatic coupling;

a second transmission part for transmitting second information through non-contact communication using electromagnetic induction;

a second reception part for receiving the second information through the non-contact communication using the electromagnetic induction; and an image display device for displaying an image based on one of the first information received by the first reception part and the second information received by the second reception part, and wherein the first transmission part and the first reception part are formed of electrodes which are placed in an opposed manner, wherein the second transmission part and the second reception part are each formed of a coil, and wherein the electrode of the first transmission part has a smaller area than the electrode of the first reception part.

12. A communication system by electrostatic coupling and electromagnetic induction, the communication system comprising:

a first transmission part for transmitting first information through non-contact communication using electrostatic coupling;

a first reception part for receiving the first information through the non-contact communication using the electrostatic coupling;

a second transmission part for transmitting second information through non-contact communication using electromagnetic induction;

a second reception part for receiving the second information through the non-contact communication using the electromagnetic induction; and an image display device for displaying an image based on one of the first information received by the first reception part and the second information received by the second reception part, and wherein the first transmission part and the first reception part are formed of electrodes which are placed in an opposed manner, wherein the second transmission part and the second reception part are each formed of a coil, wherein the coil of the second reception part has an axis line substantially perpendicular to a screen of the image display device, and wherein the coil of the second reception part is arranged in such a manner as to surround the image display device in a plane substantially in parallel with the screen of the image display device.

13. A communication system by electrostatic coupling and electromagnetic induction, the communication system comprising:

a first transmission part for transmitting first information through non-contact communication using electrostatic coupling;

a first reception part for receiving the first information through the non-contact communication using the electrostatic coupling;

a second transmission part for transmitting second information through non-contact communication using electromagnetic induction;

a second reception part for receiving the second information through the non-contact communication using the electromagnetic induction; and an image display device for displaying an image based on one of the first information received by the first reception part and the second information received by the second reception part, and wherein the first transmission part and the first reception part are formed of electrodes which are placed in an opposed manner, wherein the second transmission part and the second reception part are each formed of a coil, and wherein the electrode of the first reception part is disposed on a back side of the image display device.

14. A communication system by electrostatic coupling and electromagnetic induction, the communication system comprising:
- a first transmission part for transmitting first information through non-contact communication using electrostatic coupling;
- a first reception part for receiving the first information through the non-contact communication using the electrostatic coupling;
- a second transmission part for transmitting second information through non-contact communication using electromagnetic induction;
- a second reception part for receiving the second information through the non-contact communication using the electromagnetic induction;
- an image display device for displaying an image based on one of the first information received by the first reception part and the second information received by the second reception part; and
- an alignment guide for disposing the electrode of the first transmission part to be aligned with the electrode of the first reception part in an opposed manner, and wherein the first transmission part and the first reception part are formed of electrodes which are placed in an opposed manner, wherein the second transmission part and the second reception part are each formed of a coil.

\* \* \* \* \*